Figure 1:
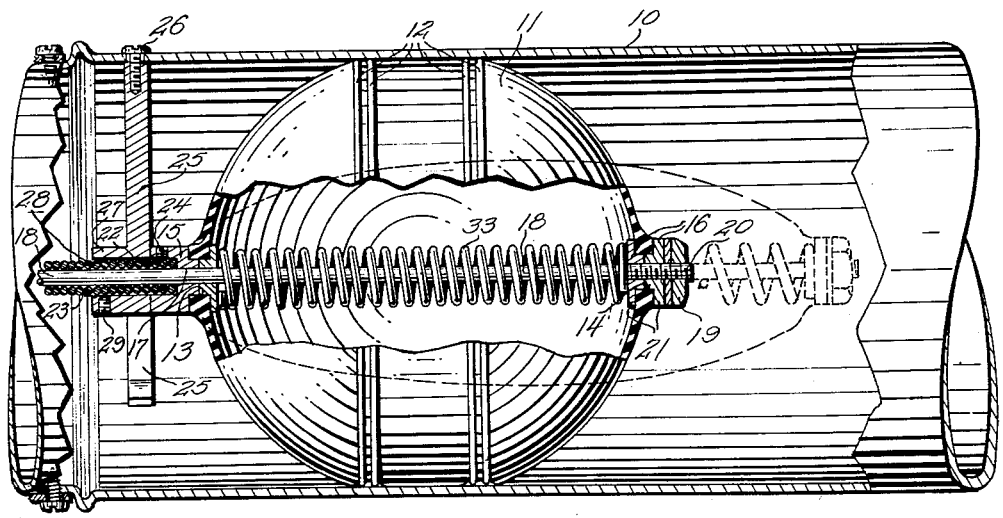

INVENTOR.
Louis W. Falk
BY
Attorney

United States Patent Office 3,015,469
Patented Jan. 2, 1962

3,015,469
CONTROL VALVE FOR VENTILATING DUCTS
Louis W. Falk, 4723 N. Cumberland Blvd.,
Whitefish Bay 11, Wis.
Filed Feb. 9, 1961, Ser. No. 88,071
8 Claims. (Cl. 251—331)

This invention relates to a control valve for regulating the flow of fluid through a cylindrical duct.

While the device is intended primarily for use in conjunction with the ventilating ducts of airplanes, automobiles and the like, it is within the purview of the present invention to utilize the device in conjunction with the regulation of the flow of fluid through any cylindrical duct.

While various forms of valves have been utilized for regulating the flow of fluid through ducts, it has been a common fault for these valves to be loose, unstable and noisy in operation. The damper type valve fails to lend itself either to stable or draft free positioning under the influence of the pressure of fluid traveling through the duct. The most common type of valve, now in use in ventilating systems, is the butterfly type which tends to flutter, be noisy in operation and not draft free in closed position. To the best of my knowledge, the various forms of flow regulating valves applied to ventilating ducts carrying fluid at relatively high velocity have had numerous shortcomings in the means for maintaining them draft free in properly adjusted position or in the attempts to avoid their noisy operation.

The primary object of the present invention resides in the provision of a new and improved control valve for regulating the flow of fluid through a duct which will overcome the inherent shortcomings of valves previously used for this purpose.

Another object resides in the provision of a new and improved control valve constructed in a manner to be draft free when the same is in closed position.

Another object of the present invention resides in the provision of a new and improved control valve comprising a hollow resilient deformable valve body which serves in relaxed position to provide a draft free sealing engagement with the inner surface of the duct to preclude the flow of fluid through the duct.

Another object of the invention resides in the provision of manually operable means for effecting the deformation of the hollow resilient valve body by its axial elongation to thereby reduce the transverse diameter of the body and provide an opening between the outer surface of the deformable valve body and the inner surface of a cylindrical duct to thereby control and regulate the flow of fluid through the duct.

Another object resides in the streamlined contour of the elongated deformable valve body which serves not only to control the size of the unobstructed fluid passage but also to facilitate the quiet flow of the accurately controlled volume of fluid past the open valve.

Another object resides in the provision of means for retaining the control valve in position within the cylindrical duct.

Another object resides in the provision of remotely positioned manually operable means for effecting the deformation of the control valve body to thereby alter the size of the passage between the internal surface of the cylindrical duct and the outer surface of the control valve to thereby regulate the flow of fluid through the duct.

Another object of the invention resides in the provision of new and improved means for normally retaining the hollow resilient deformable valve body in elongated position.

Other objects and advantages will become apparent from the following description of an illustrative embodiment of the present invention.

Figure 2:
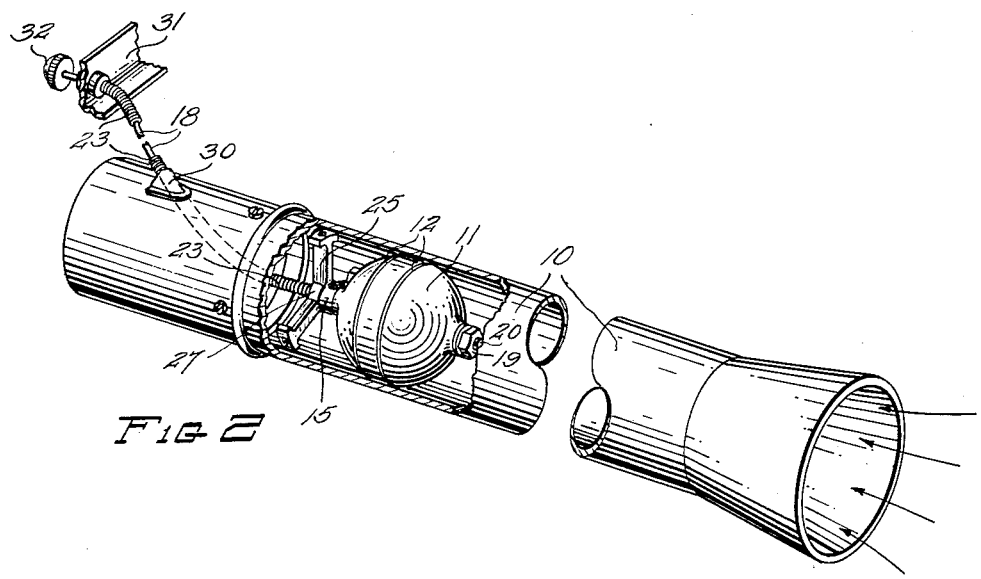

In the drawing:

FIGURE 1 is a fragmentary side elevational view of a cylindrical conduit within which a valve embodying the teachings of the present invention is incorporated; and FIG. 2 is a perspective view of a conduit showing the positioning of the control valve therein and remote manually operable means for effecting the elongation of the hollow resilient deformable valve element to thereby regulate the flow of fluid through the duct.

Before entering into a detail description of the construction and operation of the control valve, it is deemed advisable to comment briefly upon a preferred application for the present invention.

As previously stated the invention is intended primarily for use in conjunction with ventilating ducts in airplanes, automobiles and the like. In the case of airplanes, the need for controlled ventilation in the cabin of the plane is well known for the purpose of maintaining the desired temperature regardless of the altitude or outside temperature. To a minor degree the same condition exists in maintaining proper ventilation in an automobile.

Referring more particularly to the illustrative embodiment of the invention shown in FIG. 1, it will be noted that a cylindrical duct 10 which forms a portion of the ventilating system contains a resilient hollow rubber or neoprene ball that comprises a deformable valve body 11 for controlling the flow of fluid through the duct. In some instances it may be desirable to provide the hollow deformable ball with parallel circumferentially extending beads 12 for the purpose of effecting a more positive seal between the valve body 11 and the inner surfaces of the cylindrical duct 10. The valve body 11 is provided with diametrically opposed openings 13 and 14 and adapted to respectively receive fittings 15 and 16. The fitting 15 is provided with an axial bore 17 that forms a guide for slidably receiving a flexible actuating rod 18 that extends through the hollow valve body 11 and that is releasably retained in fixed position in the fitting 16 by the application of a jam nut 19 applied to the threaded extremity 20 of the actuating rod 18. It should be noted that the fitting 16 is provided with a pair of spaced flanges 21 that serve to encompass and retain the opening 14 in the valve body 11 fixedly attached to the fitting 16.

The fitting 15 is similarly formed so that it may be applied to the opening 13 formed in the valve body 11. The fitting 15 is provided with an axial bore 22 having a diameter capable of receiving a flexible casing 23 that houses the actuating rod 18. The fitting 15 is releasably retained in fixed position on the end of the casing 23 by the application of a set screw 24 so that axial movement of the rod 18 serves to adjustably alter the axial dimension of the body 11.

The entire valve assembly is mounted on a spider 25 that is disposed transversely of the duct 10 and releasably retained therein by the application of cap screws 26 that extend through the wall of the duct and into threaded openings in the legs of the spider 25. The spider 25 is provided with a hub portion 27 having an axial bore 28 adapted to slidably receive the casing 23 of the valve actuating means. A set screw 29 extending through the wall of the hub 27 serves to fixedly anchor the valve actuating means in the spider 25.

Referring more particularly to FIG. 2 of the accompanying drawing, it will be noted that the casing 23 of the valve actuating mechanism extends through a suitable fitting 30 attached to the surface of the duct 10 and has its outer end attached to a fixed support 31 located within easy reach of the operator.

An operating knob 32 fixedly positioned on the exposed end of the flexible valve actuating rod 18 provides a means by which the rod may be moved in an axial direction to effect the axial elongation of the normally spherical hollow valve body 11 and simultaneously reduce its transverse dimension to establish an open passage between the surface of the valve body 11 and the inner surface of the duct 10 to thereby regulate the amount of fluid admitted to the compartment of the vehicle.

Any conventional means (not shown) may be employed to releasably retain the actuating rod 18 in its properly adjusted position.

In order to assist in the elongation of the hollow valve body 11 it may be desirable to incorporate a compression spring 33 surrounding that portion of the actuating rod 18 disposed within the hollow valve body 11 with the ends of the spring respectivly abutting fittings 15 and 16.

Reference to the dotted line showing of the deformed valve body 11 shown in FIG. 1 clearly illustrates the means which the transverse dimension of the valve body may be effectively altered to regulate the amount of fluid flowing past the deformed valve body 11.

With the arrangement shown and described, it will readily be understood that the contour of the deformed valve body 11 is such that it provides a streamlined form that affords a free flow of fluid past the valve body 11. When the valve body is returned to its normally closed position, as indicated in full line in FIG. 1, it will readily be understood that the pressure of incoming fluid on the forward surface of the valve body 11 will serve to effectively seal the duct 10 to preclude the passage of fluid past the closed valve.

The amount of elongation of the deformable valve body 11 may be regulated with a degree of nicety which permits the accurate control of the amount of fluid that will be directed into the passenger's compartment of the vehicle in accordance with the operator's control.

From the foregoing description of an illustrative embodiment of the present invention, it will be noted that a simple, inexpensive and effective valve means has been provided in the form of a hollow resilient deformable valve body adapted for controlled elongation under manual manipulation of an actuating rod to alter the resultant unobstructed passage between the inner surface of the cylindrical duct and the outer surface of the deformable hollow valve body to thereby regulate and control the flow of fluid through the duct.

While the invention has been described in considerable detail in the foregoing specification, it is to be understood that various changes may be made in its embodiment without departing from or sacrificing any of the advantages hereinafter claimed.

I claim:

1. The combination with a fluid conducting system including a cylindrical duct, of a control vale in said duct for regulating the flow of fluid through the duct, said control valve comprising a resilient deformable hollow body portion having a normal transverse diameter substantially equal to the internal diameter of said duct and cooperating therewith in relaxed condition to form a sealing closure for said duct, a valve mounting bracket in said duct, attaching means adapted to be fixedly secured to a portion of said hollow valve body to retain the same in fixed relationship with said valve mounting bracket, an actuating rod slidably receivable through said valve mounting bracket and extending through said hollow valve body, anchoring means on said actuating rod adapted for attachment to said hollow valve body at a point diametrically opposite to said attaching means whereby axial movement of said actuating rod in one direction in said body portion serves to elongate the axial dimension of said hollow valve body and simultaneously decrease its transverse dimension to form an unobstructed passage between the outer surface of said valve body and the inner surface of said duct to thereby control and regulate the flow of fluid through said duct in accordance with the size of said unobstructed passage as predetermined by the manually adjusted position of said actuating rod.

2. A fluid conducting system, as set forth in claim 1, in which said resilient hollow deformable valve body is substantially spherical in its relaxed condition.

3. A fluid conducting system, as set forth in claim 1, in which said valve mounting bracket is of spider form having a hub portion to which one portion of said deformable valve body is fixedly attached.

4. A fluid conducting system, as set forth in claim 1, in which movement of said actuating rod is effected through the medium of a flexible motion transmitting connection.

5. The combination with a fluid conducting system including a cylindrical duct, of a control valve in said duct operable to control and regulate the flow of fluid through said duct, said control valve comprising a resilient normally form-sustaining hollow body portion having a normal transverse diameter substantially equal to the internal diameter of said cylindrical duct and cooperating therewith in relaxed condition to form a sealing closure for said duct, a valve mounting bracket fixedly positioned in said duct, securing means for attaching one portion of said hollow valve body in fixed relationship with said mounting bracket, a manually operable valve actuating rod journalled for axial sliding movement through said valve mounting bracket, said actuating rod having one of its ends positioned remotely from said valve, an intermediate portion extending through said valve, and its other end fixedly attached to said valve body at a point diametrically opposite said securing means, whereby axial movement of said actuating rod in one direction in said body portion serves to elongate the axial dimension of said hollow valve body and simultaneously decrease its transverse dimension to form an unobstructed passage between the outer surface of said valve body and the inner surface of said duct to thereby control and regulate the flow of fluid through said duct in accordance with the size of said unobstructed passage as predetermined by the manually adjusted position of said actuating rod.

6. A fluid conducting system, as set forth in claim 5, in which said resilient hollow deformable valve body is substantially spherical in its relaxed condition.

7. A fluid conducting system, as set forth in claim 5, in which said valve mounting bracket is of spider form having a hub portion to which one portion of said deformable valve body is fixedly attached.

8. A fluid conducting system, as set forth in claim 5, in which movement of said actuating rod is effected throug hthe medium of a flexible motion transmitting connection.

References Cited in the file of this patent

UNITED STATES PATENTS

| | | |
|---|---|---|
| 1,506,418 | Evensta | Aug. 26, 1924 |
| 2,177,916 | Thomas et al. | Oct. 31, 1939 |